C. B. REDRUP.
FLUID PRESSURE ENGINE OR PUMP.
APPLICATION FILED AUG. 10, 1911.

1,050,691.

Patented Jan. 14, 1913.
4 SHEETS—SHEET 1.

Witnesses.

Inventor:
Charles B. Redrup,
by Wilkinson, Fisher & Witherspoon
Attorneys

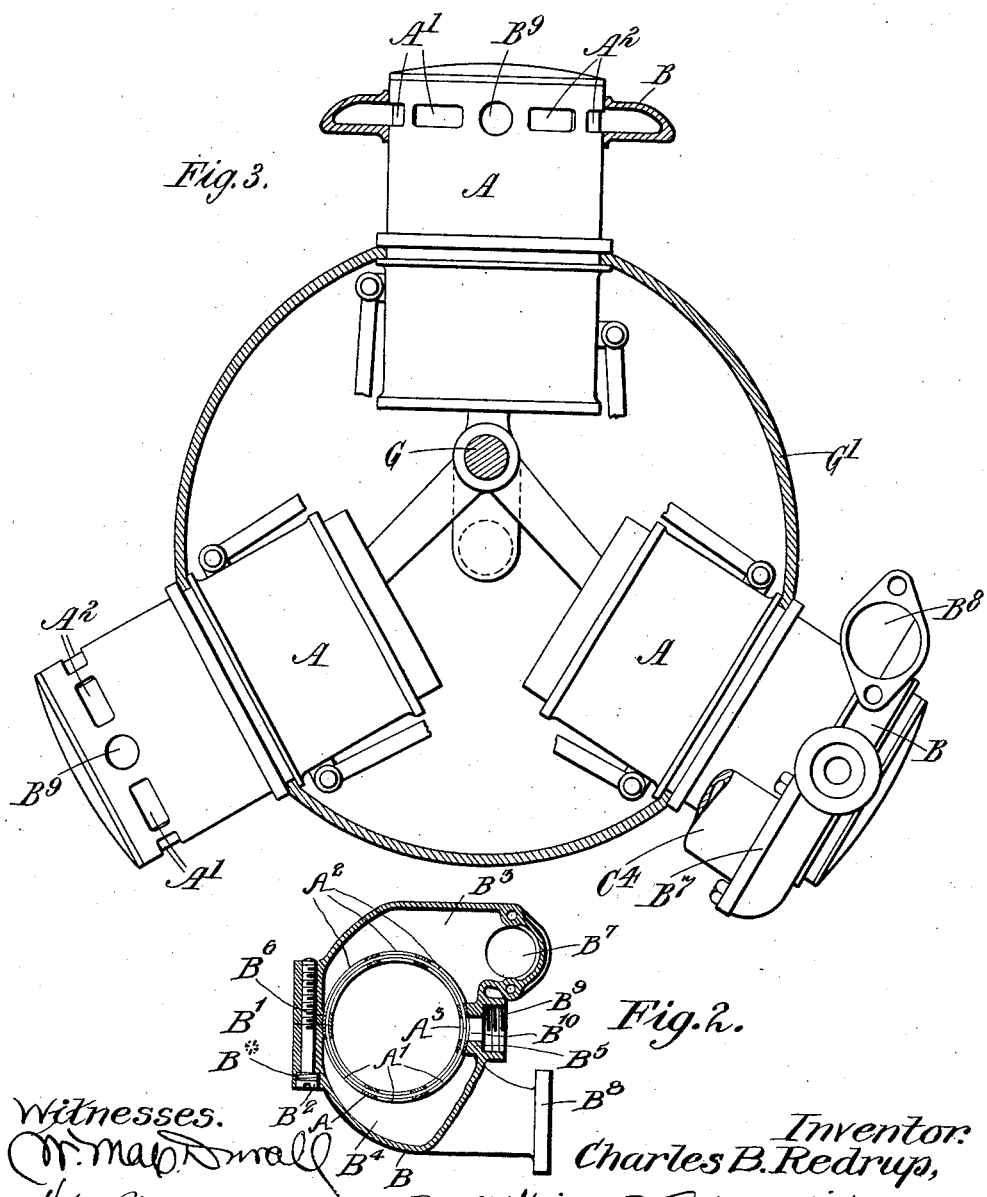

C. B. REDRUP.
FLUID PRESSURE ENGINE OR PUMP.
APPLICATION FILED AUG. 10, 1911.
1,050,691.
Patented Jan. 14, 1913.
4 SHEETS—SHEET 3.
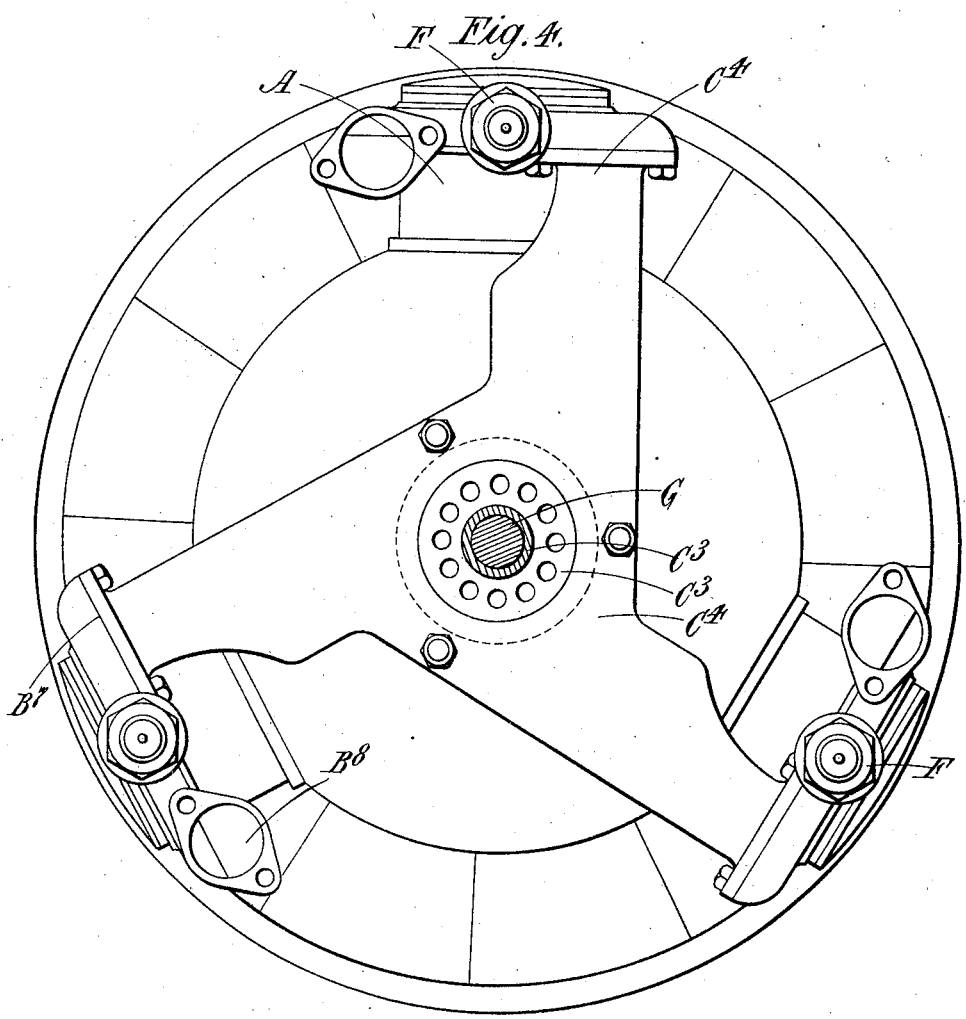

C. B. REDRUP.
FLUID PRESSURE ENGINE OR PUMP.
APPLICATION FILED AUG. 10, 1911.

1,050,691.

Patented Jan. 14, 1913.
4 SHEETS—SHEET 4.

Witnesses.

Inventor:
Charles B. Redrup,
by Wilkinson, Fisher & Witherspoon
Attorneys

UNITED STATES PATENT OFFICE.

CHARLES BENJAMIN REDRUP, OF CANTON, CARDIFF, ENGLAND.

FLUID-PRESSURE ENGINE OR PUMP.

1,050,691.  Specification of Letters Patent.  Patented Jan. 14, 1913.

Application filed August 10, 1911. Serial No. 643,454.

*To all whom it may concern:*

Be it known that I, CHARLES BENJAMIN REDRUP, a subject of the King of England, residing at Canton, Cardiff, county of Glamorgan, Wales, England, have invented certain new and useful Improvements in Fluid-Pressure Engines or Pumps, of which the following is a specification.

This invention is for improvements in or relating to fluid-pressure engines or pumps.

The invention particularly relates to engines or pumps wherein the cylinders are made of thin sheet material or thin tubing which affords little hold for bolts or other devices to connect the inlet and exhaust conduits, as the tube being drawn provides no lugs or other projections for this purpose.

According to the present invention there is employed with the cylinder of a fluid-pressure engine or pump having ports in its outer face, a hollow collar that surrounds and grips the cylinder over the ports and is provided with means for connecting one or more conduits or their equivalent to the cylinder, so that they may communicate with the ports. Preferably the collar takes the form of a split strap whereof the ends are forcibly drawn together, for example by a screw, in order that it may grip the cylinder. By means of this invention a cylinder that has a smooth exterior such as would be provided by a drawn tube, may readily have mounted upon it in such manner as to be fluid-tight, a means of connection with the conduits that are to serve the cylinder.

Figure 1:
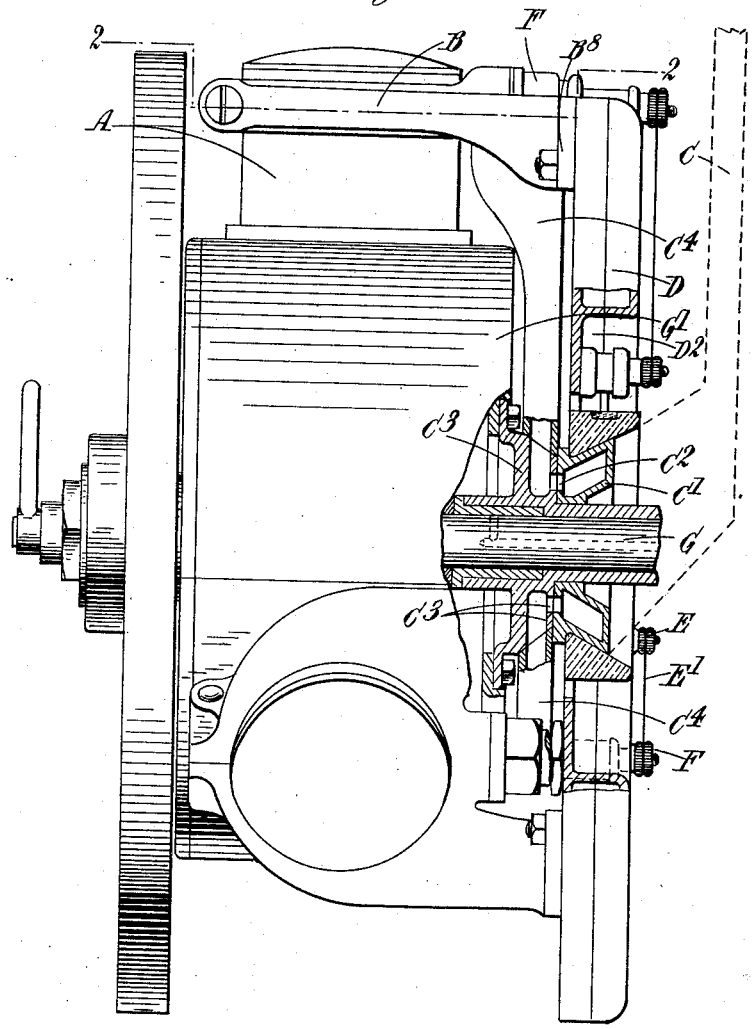
Figure 5:
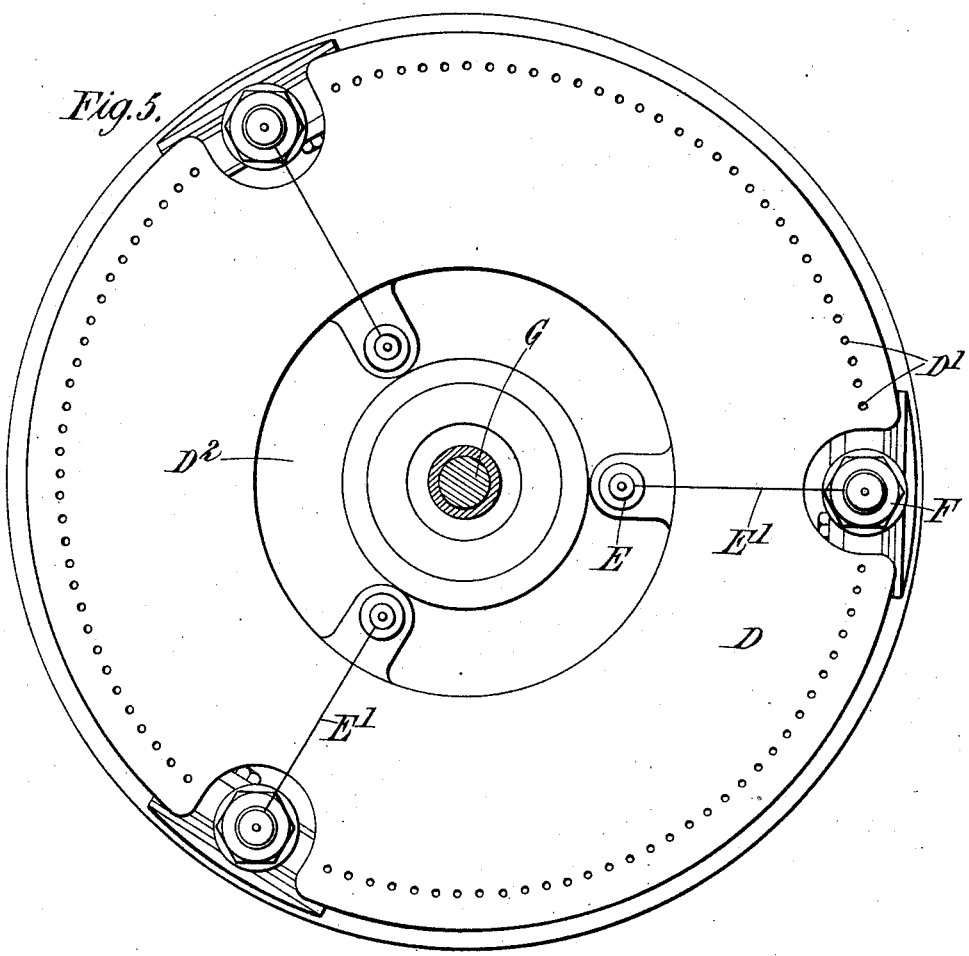

In the accompanying drawings which show the invention applied to an internal combustion engine of the rotating radial cylinder type:—Figure 1 is a side elevation of the engine with part in section for the sake of clearness; Fig. 2 is a section on the line 2—2 of Fig. 1; Fig. 3 is a central vertical section through the crank-case, the cylinders being in full and other parts removed for the sake of clearness; Fig. 4 is a view of the engine from the right of Fig. 1 with the exhaust box removed, and Fig. 5 is an elevation of the engine from the right of Fig. 1 with the exhaust box in place.

Like letters indicate like parts throughout the drawings.

The cylinders A are conveniently built of comparatively thin tubing having a smooth exterior and provided with two sets of ports $A^1$, $A^2$ respectively at their head ends. Surrounding these ports is a hollow collar or strap B. This is split at $B^1$ and fits snugly around the cylinder, the two ends being drawn tightly together by a screw $B^2$. Under the head of the screw $B^2$ is a spring washer $B^{2*}$ to allow for expansion. The collar when the screw $B^2$ has been tightened firmly grips the cylinder so that it is held in place by friction thereon making a fluid-tight joint therewith and covers the ports $A^1$, $A^2$. The interior of the collar is divided into two chambers $B^3$ and $B^4$ by partitions $B^5$ and $B^6$. The chamber $B^3$ communicates with all the ports $A^2$ and also with a connecting end $B^7$ that communicates with the induction conduit. The chamber $B^4$ communicates with all the ports $A^1$ and also with the connecting end $B^8$ that communicates with the exhaust conduit or box.

In the partition $B^5$ a screw-threaded socket $B^9$ is formed to receive an ignition plug F and extending from the socket is an orifice $B^{10}$ that communicates with a corresponding orifice $A^3$ in the cylinder of the engine, in order that the gases of combustion may be able to come into contact with the sparking points of the ignition device.

The engine shown has three cylinders and when all the straps are in position the connections for the induction conduit shown in dotted lines at C can be made. This conduit has a conical end $C^1$ that with the conduit is stationary and this has a perforated face $C^2$ that bears against a correspondingly perforated face $C^3$ provided at the center of three radially disposed arms $C^4$. The part $C^3$ surrounds the crank-shaft G and is bolted to the crank-case $G^1$; the arms $C^4$ are formed of a separate piece that is fitted over the part $C^3$ so that in practice it constitutes a continuation of this part. The end of each of these arms is shaped to be bolted on to the connecting ends $B^7$ of the strap and thus the radial arms are held in place and carried around with the cylinders of the engine and as these revolve with the crank-case, the parts $C^3$ and $C^4$ move as one piece being stationary relatively to each other. The charge for the cylinders can at all times pass through the orifices $C^2$ and those in the part $C^3$ so that the arms $C^4$ with the part $C^3$ constitute radial extensions of the induction conduit C which are rotatable relatively to the main body of the conduit.

The exhaust box takes the form of an annular chamber D having peripheral perforations D¹ and this is bolted securely to the flanged connections B⁸ of the straps B. The contents of the chambers B⁴ of the straps are therefore discharged direct into this annular exhaust conduit or box and finally escape by the perforations D¹. The box being annular affords a central space D² wherein the terminals E connected by wires E¹ to the ignition plugs F and the connections for the induction conduit C can be accommodated.

It will be seen from the above that the straps B constitute an exceedingly simple device whereby cylinders built of thin sheet material or tubing may have their conduits connected to them without bolts or rivets having to be entered into the walls of the cylinders and the arrangement of the induction conduit with its radial arms and the circular exhaust box are particularly adapted for connection to an engine provided with these straps.

In the engine shown, the ports A¹, A² are intended to be controlled by sleeve valves and for this purpose the walls of the cylinder are made double as shown in Fig. 2 so that the valves can slide between the two portions. As these valves, however, form no part of the present invention it is unnecessary to describe them in this specification.

Although it has been stated that the cylinders may be made of thin sheet material or tubing, it will be understood that the invention is not restricted to cylinders built up in this manner as the straps could be applied to cast cylinders having a smooth exterior portion whereon the strap could be made to grip.

What I claim as my invention and desire to secure by Letters Patent is:—

1. In a fluid-pressure engine or pump the combination of, a cylinder-member having a smooth exterior surface, and inlet and outlet ports in its outer face, and a hollow collar that is placed around and made to grip the cylinder-member over the ports, such collar being so shaped that a conduit can be connected thereto and by it brought into communication with one of the classes of ports of the cylinder-member, substantially as set forth.

2. In a fluid-pressure engine or pump, the combination of, a cylinder-member having a smooth exterior surface, and inlet and outlet ports in its outer face, a hollow split collar or strap that is placed around the cylinder over the ports, the collar being so shaped as to provide means for connecting a conduit thereto and to provide communication between such conduit and one of the two classes of ports, and means for forcibly drawing together the split portions of the strap in order that the whole may grip the cylinder-member, substantially as set forth.

3. In a fluid-pressure engine or pump, the combination of, a cylinder-member having a smooth exterior surface, and inlet and outlet ports in its outer face, and a hollow collar that is placed around and made to frictionally grip the cylinder-member over the ports, such collar being divided by partitions into two chambers, whereof one communicates with one class of ports and the other with the other class of ports, each having an exterior mouth in the collar, the collar moreover providing means for connecting a conduit to one of the exterior mouths, substantially as set forth.

4. In an internal combustion engine the combination of, a cylinder-member having inlet and outlet ports in its outer face, and a hollow collar that is placed around and made to grip the cylinder-member over the ports, such collar being divided by partitions into two chambers, whereof one communicates with one class of ports and the other with the other class of ports each having an exterior mouth in the collar, one of the partitions moreover having in it an orifice for the insertion of an ignition plug, the cylinder-member having a corresponding orifice to permit access of the gases of combustion to the ignition plug, the collar moreover affording means whereby a conduit can be connected to one of the exterior mouths substantially as set forth.

5. In an internal combustion engine of the rotating cylinder type, with the cylinders disposed radially around the crank-case, the combination of, inlet and outlet ports in the outer face of each cylinder-member, a hollow collar placed one around each cylinder-member and made to grip the same over the ports, the collar being divided by partitions into two chambers, one communicating with one class of ports and the other with the other class of ports, and each having an exterior mouth in the collar, the collar moreover being provided with means for connecting a conduit to one of these mouths, and an induction conduit having arms that extend radially therefrom and are connected one to each of the hollow collars of the respective cylinder-members, substantially as set forth.

6. In an internal combustion engine of the rotating cylinder type with the cylinders disposed radially around the crank-case, the combination of, a cylinder-member having inlet and outlet ports in its outer face, a hollow collar, one for each cylinder-member that is placed around and made to grip the cylinder-member over the ports, such collar being divided by partitions into two chambers, whereof one communicates with one class of ports and the other with the other class of ports, each chamber having an external mouth in the collar and the collar being moreover provided with means for connecting a conduit to one of these orifices, and an annular exhaust box constituting such conduit and provided with orifices to communicate with one of the orifices in each of the collars, which box is connected to all of the collars and has peripheral discharge outlets, substantially as set forth.

7. In an internal combustion engine of the rotating cylinder type with the cylinders disposed radially around the crank-case, the combination of, inlet and outlet ports in the outer face of each cylinder-member, a hollow collar placed one around each cylinder-member and made to grip the same over the ports, the collar being divided by partitions into two chambers one communicating with one class of ports and the other with the other class of ports, and each having an exterior mouth in the collar, an induction conduit having arms that extend radially therefrom and that are connected one to each of the hollow collars of the respective cylinder-members, each arm communicating with one of the mouths in the collar, and an annular exhaust box provided with orifices to communicate with the other mouth in each of the collars and which box is connected to all of the collars, substantially as set forth.

8. The combination with an internal combustion engine cylinder having an ignition, and inlet and exhaust ports, of a casing secured to said cylinder over said ports and providing fuel admission and exhaust chambers, and said casing constructed to have an ignition plug mounted thereon, at the point of said ignition port, substantially as described.

9. The combination with an internal combustion engine cylinder having a smooth exterior surface and provided with an ignition, and inlet and exhaust ports, of a casing frictionally secured to said cylinder exterior surface over said ports and providing fuel admission and exhaust chambers, and said casing constructed to have an ignition plug mounted thereon, at the point of said ignition port, substantially as described.

In testimony whereof I have signed my name to this specification in the presence of two subscribing witnesses.

CHARLES BENJAMIN REDRUP.

Witnesses:
 HUGH M. INGLEDEW,
 GEVILYNE JONES.

---

Copies of this patent may be obtained for five cents each, by addressing the "Commissioner of Patents, Washington, D. C."